United States Patent
Ineichen

(10) Patent No.: US 11,219,918 B2
(45) Date of Patent: Jan. 11, 2022

(54) DEVICE AND METHOD FOR DISPENSING A FLOWABLE MEDIUM

(71) Applicant: Robatech AG, Muri (CH)

(72) Inventor: Beatus Ineichen, Weggis (CH)

(73) Assignee: ROBATECH AG, Muri (CH)

( * ) Notice: Subject to any disclaimer, the term of this patent is extended or adjusted under 35 U.S.C. 154(b) by 1 day.

(21) Appl. No.: 16/830,707

(22) Filed: Mar. 26, 2020

(65) Prior Publication Data

US 2020/0306788 A1    Oct. 1, 2020

(30) Foreign Application Priority Data

Mar. 29, 2019    (EP) .................................... 19166080

(51) Int. Cl.
*B05C 11/10*  (2006.01)
*B29B 13/02*  (2006.01)
*B05C 5/02*   (2006.01)
*F16K 41/12*  (2006.01)
(Continued)

(52) U.S. Cl.
CPC ........ *B05C 11/1026* (2013.01); *B05C 5/0225* (2013.01); *B05C 11/1013* (2013.01); *B29B 13/022* (2013.01); *F16K 1/00* (2013.01); *F16K 1/32* (2013.01); *F16K 41/12* (2013.01)

(58) Field of Classification Search
CPC ............. B05C 11/1026; B05C 11/1013; B05C 5/0225; B29B 13/022; F16K 41/12; F16K 1/00; F16K 1/32
See application file for complete search history.

(56) References Cited

U.S. PATENT DOCUMENTS

| 3,128,632 A | 4/1964 | Green |
| 5,941,505 A | 8/1999 | Nagel |
| (Continued) | | |

FOREIGN PATENT DOCUMENTS

| CN | 2 275 676 Y | 9/2005 |
| DE | 36 30 910 A1 | 3/1988 |
| (Continued) | | |

OTHER PUBLICATIONS

European Patent Office, European Search Report and Written Opinion, dated Oct. 9, 2019 (dated Oct. 9, 2019), 8 pages, European Patent Office, Munich, Germany.

*Primary Examiner* — Frederick C Nicolas
(74) *Attorney, Agent, or Firm* — Christopher C. Drennan, P.C.; Christopher C. Dremann

(57) ABSTRACT

A device and method for dispensing a flowable medium has a housing with an interior space and a rod mounted in the housing that is movable between a first end position and a second end position and passes through a diaphragm mounted in a sealed manner in the housing radially on the outside and in the rod radially on the inside. The diaphragm divides the interior space into a first cavity and a second cavity separated from the first cavity in a fluid tight manner. The flowable medium can flow through at least one channel that opens into the first cavity, and is dispensed through a dispensing opening. A sealing section of the rod closes the dispensing opening in the first end position and is at a distance from the dispensing opening in the second end position. A pressure medium acts on the diaphragm in the second cavity.

19 Claims, 1 Drawing Sheet

(51) Int. Cl.
*F16K 1/00* (2006.01)
*F16K 1/32* (2006.01)

(56) References Cited

U.S. PATENT DOCUMENTS

| | | | |
|---|---|---|---|
| 7,021,750 B2* | 4/2006 | Shibata | B41J 2/17596 |
| | | | 347/85 |
| 7,617,955 B2* | 11/2009 | Riney | B05C 5/0225 |
| | | | 222/504 |
| 8,576,032 B2* | 11/2013 | Herbert | F16K 31/0672 |
| | | | 335/220 |
| 8,616,525 B2* | 12/2013 | Franz | F16K 41/12 |
| | | | 251/331 |
| 2015/0059882 A1 | 3/2015 | Kraus | |

FOREIGN PATENT DOCUMENTS

| | | |
|---|---|---|
| DE | 10 2015 000 630 B3 | 2/2016 |
| WO | 2009019036 A1 | 2/2009 |

\* cited by examiner

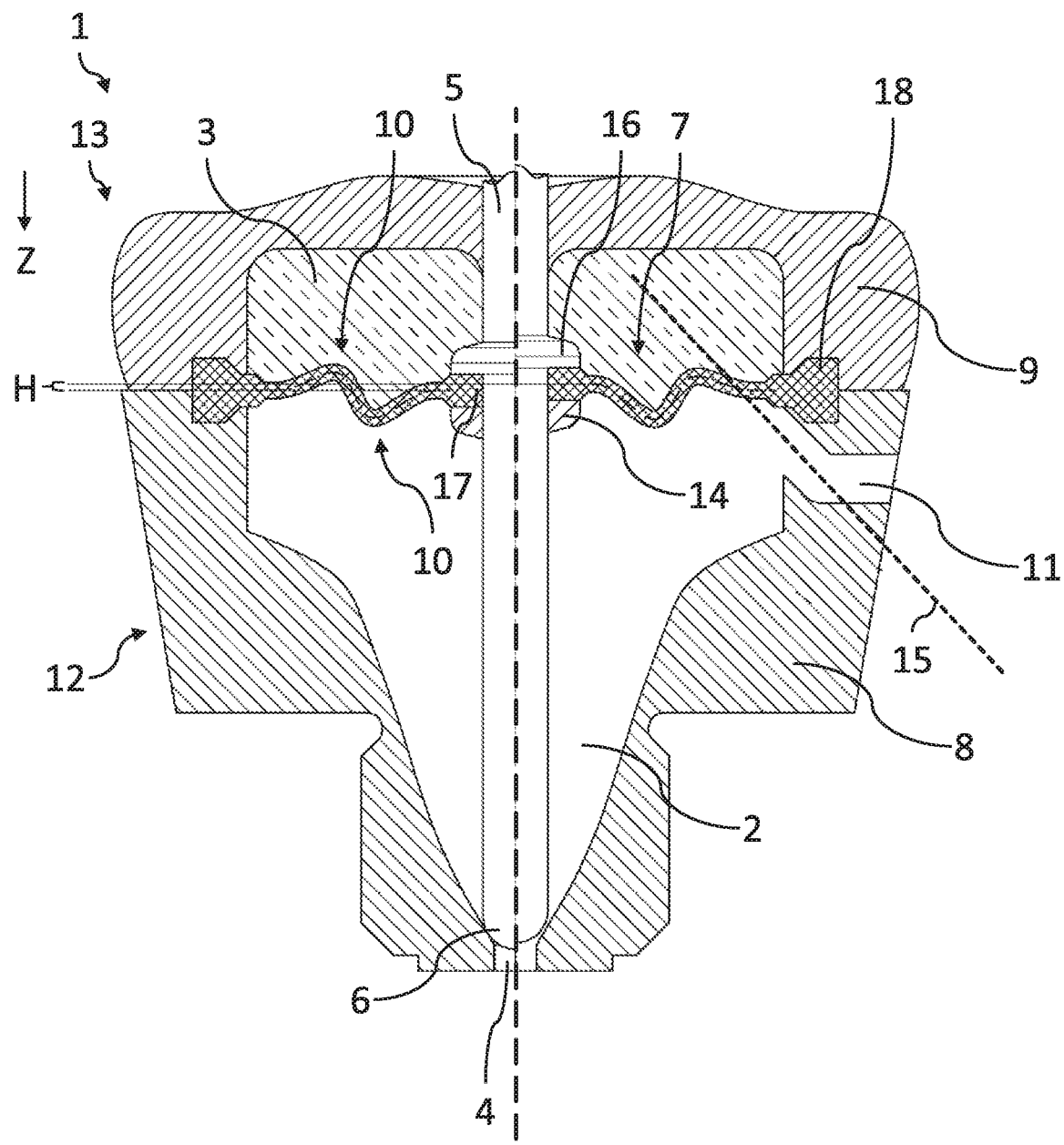

DEVICE AND METHOD FOR DISPENSING A FLOWABLE MEDIUM

FIELD OF THE INVENTION

The present invention relates to a device for dispensing a flowable medium, wherein the flowable medium is preferably an adhesive, in particular a hot glue or hot melt adhesive. Moreover, the present invention relates to a method for operating a device of this kind.

BACKGROUND OF THE INVENTION AND RELATED ART

Devices for dispensing a flowable medium are used to apply a flowable medium in portions to a substrate, for example. In this context, the application of the flowable medium generally takes place in a controlled manner, wherein the device has a dispensing opening for dispensing the flowable medium, wherein this dispensing opening can be closed and opened by means of a sealing section of a rod movable by means of an actuator. To this extent, a device of this kind has a closable valve. A device for dispensing a flowable medium can also be designed as a pressure control valve, pressure relief valve or restrictor. In the case of design as a restrictor, the dispensing opening remains permanently open as operation continues. The embodiment as a pressure control valve or a pressure relief valve to limit a pressure can be a safety element, wherein the dispensing opening is normally closed and very seldom opened to achieve the function of pressure limitation.

In respect of such devices for dispensing a flowable medium of the abovementioned type, one particular problem is that of preventing the flowable medium from entering the region of the actuator or the region of a bearing section of the device for the rod. In order to seal off the actuator and/or the bearing section with respect to the flowable medium, in particular with respect to a cavity holding the flowable medium, seals are used, wherein two different types of seal are known in principle for this purpose.

On the one hand, there is a so-called "dynamic seal", wherein, in the case of a dynamic seal, the seal or the sealing element is formed or arranged between two surfaces that move relative to one another during the operation of the device. One disadvantage with this type of sealing is that, in long-term operation of the device, the dynamic seal is worn away and, as a result, the seal loses its sealing effect, and there may be unwanted penetration of flowable medium into the region of the actuator and/or of the bearing section as a consequence. Apart from the inevitable wear, one known disadvantage of dynamic seals is the lack of freedom from leakage. This means that, with each double stroke of the rod, a certain quantity of the flowable medium passes continuously through the sealing region. These are very small quantities, which become greater with increasing wear of the seal. Dynamic seals furthermore have the characteristic that they can stick after a prolonged stoppage. In this case, the stationary flowable medium may stick around the sliding region of the seal and hinder sliding or render it impossible. When using a device of this kind to dispense a flowable medium as a safety element, e.g. as a pressure relief valve, this can lead to failure of the valve, and the safety function would thus not be assured.

On the other hand, so-called "static seals", in particular in the form of bellows seals, are known from the prior art. In contrast to a dynamic seal, sealing does not take place between two surfaces that move relative to one another in the case of a bellows seal; instead, the bellows seal is connected statically by a first section to the rod and statically by a second section to another element of the device, wherein the rod moves relative to the second element of the device. Typically, the second element is a partial region of the housing. In the case of a static seal, the movement of the rod relative to the element of the device is accommodated by a deformation of the seal in the axial direction, more specifically extension or expansion or compression.

A device for dispensing a flowable medium having a static seal in the form of a bellows seal is known from DE 10 2015 000 630 B3, for example.

A device having a static seal in the form of a diaphragm is known from WO 2009/019036 A1, which relates to a needle valve arrangement for controlling flowable media, in particular paint materials in a coating system. The needle valve arrangement comprises a needle seal and a sealing diaphragm, which is connected firmly to the valve needle and is designed to be movable with said needle. The needle valve arrangement disclosed in the abovementioned document has features of the device of the present invention. By way of example, WO 2009/019036 A1 discloses a device for dispensing a flowable medium having:

a housing with an interior space,
a rod mounted in the housing, wherein the rod can be moved by means of an actuator between a first end position and a second end position in an axial direction and vice versa,
a diaphragm, wherein the rod passes through the diaphragm, wherein the diaphragm is mounted in a sealed manner in the housing radially on the outside and is mounted in a sealed manner in the rod radially on the inside, wherein the diaphragm divides the interior space into a first cavity and a second cavity, wherein the diaphragm separates the first cavity from the second cavity in a fluid tight manner, wherein the first cavity serves to hold the flowable medium,
at least one channel which opens into the first cavity and through which the flowable medium can flow into the cavity,
a dispensing opening, opening into the cavity, for dispensing the flowable medium, wherein the rod has a sealing section, wherein the sealing section closes the dispensing opening in the first end position and is arranged at a distance from the dispensing opening in the second end position.

In devices of this kind which have the above-mentioned features, the problem arises, especially at high pressures of the flowable medium in the first cavity, e.g. at pressures in a range of from 80 bar to 120 bar, that damage to the diaphragm may occur during the operation of the device, especially in the case of long-term operation of the device, owing to the high pressure loading of the diaphragm by the flowable medium.

OBJECTS AND SUMMARY OF THE INVENTION

It is therefore an object of the present invention to further develop a device that has the above-mentioned features in such a way that the device allows reliable long-term operation of the device, even at high pressures of the flowable medium. Moreover, it is an object of the invention to specify a method for operating a device of this kind.

These objects are achieved by a device which has the features of the present invention and furthermore by a method which has the features of the present invention.

To achieve the abovementioned objects, it is envisaged in respect of the device that a pressure medium acting on the diaphragm is arranged in the second cavity.

The action of the pressure medium on the diaphragm brings about at least partial compensation of the pressure loading of the diaphragm since, during operation of the device, the pressure loading of the diaphragm by the flowable medium contained in the first cavity is compensated at least partially by the pressure medium arranged in the second cavity, thereby reducing the risk of damage or tearing of the diaphragm and of wear on the diaphragm.

Another advantage in using a pressure medium in the second cavity is that no change or substantially no change in the volume of the first cavity occurs in the case of pressure changes of the flowable medium contained in the first cavity. A more precise switching behavior during the opening and closing of the dispensing opening is thereby achieved. Moreover, the occurrence of pressure fluctuations of the kind which usually occur with a sealing diaphragm, especially at high switching frequencies, is avoided, which has an advantageous effect on the precise dispensing of the medium. Here, switching frequency is taken to mean the reciprocal time interval between two successive first end positions or second end positions of the rod during the operation of the device.

The diaphragm is preferably configured in such a way that the volume of the second cavity with the pressure medium does not change during a stroke of the rod. This is advantageous especially when using incompressible media as the pressure medium. The fact that the volume of the second cavity with the pressure medium does not change during a stroke of the rod results in the advantage that the volume of the first cavity with the flowable medium likewise does not change during a stroke of the rod. Thus, a movement of the rod or actuation of the valve takes place without a disruptive change in the volume of both cavities.

Moreover, owing to the pressure medium, the resulting force which acts on the rod because the rod is connected to the diaphragm is reduced, thereby promoting a precise switching process. By virtue of the pressure medium, the resulting force on the rod is largely independent of the selected pressure of the flowable medium. This has a positive effect on the switching behavior of the device. As a result, accurately timed switching of the device and, as a consequence, a precise application of flowable medium, for example, are made possible. This precision is largely independent of the pressure.

It is regarded as particularly advantageous if the pressure medium is formed by a fluid, in particular a liquid or a gel, or the pressure medium comprises a fluid, in particular a liquid or a gel.

The liquid is, in particular, silicone oil, isopropylnaphthalene, Ruetasolv® or a grease.

However, it is also possible for the fluid to be a gas, wherein a gas is preferably used at pressures of the flowable medium of at most 10 bar, in particular at most 7 bar.

The liquid is preferably a liquid with a high viscosity, e.g. in the range of from 50 Pas to 100 Pas. Sufficiently high damping is thereby achieved in order to exert a favorable effect on the oscillation behavior.

It is also conceivable for the pressure medium to be formed by an elastomer, in particular by an elastomer molding or to comprise an elastomer or an elastomer molding. The elastomer or the elastomer molding preferably has a Shore A hardness of 25 to 40.

It is also quite conceivable for the pressure medium to be formed by a pressure cushion, wherein the pressure cushion can quite possibly contain one or more of the abovementioned fluids and/or the abovementioned elastomer.

It is regarded as particularly advantageous if the second cavity is sealed off in a fluid tight manner, and thus no fluid can flow into the second cavity or flow out of the second cavity during the operation of the device.

However, it is quite conceivable for the device to have an inlet opening which opens into the second cavity for the purpose of feeding in or discharging a fluid forming the pressure medium. By feeding in or discharging the fluid, the pressure acting on the diaphragm can be adapted. It is furthermore possible, by feeding in or discharging the fluid, to change the position of the diaphragm within the interior space and thus influence the mechanical loading of the diaphragm.

The diaphragm is preferably connected to the rod in a manner fixed relative to the rod.

In this context, it is regarded as particularly advantageous if the diaphragm is held positively and/or non-positively in the rod.

It is regarded as particularly advantageous if the diaphragm is held with a clamping action in the rod. It is quite conceivable here for the rod to have a projection formed in the radial direction and for the diaphragm to be held with a clamping action between this projection and a clamping element that can be connected to the rod.

The clamping element is, in particular, a sleeve. It is quite possible for the sleeve to be designed in such a way that it can be screwed onto a thread formed on the rod.

In order to achieve particularly stable and fluid tight clamping of the diaphragm on the rod, it is quite conceivable for the diaphragm to have a bead in the clamping region.

The diaphragm is preferably held with a clamping action in the housing.

It is regarded as particularly advantageous if the diaphragm is held with a clamping action between a housing wall section delimiting the first cavity and a housing wall section delimiting the second cavity.

In an advantageous development, it is envisaged that the diaphragm has a bead in the clamping region with the housing.

It is quite conceivable for the device to have a main body section and a head section mounted in the main body section, wherein the head section has the dispensing opening.

The channel which opens into the first cavity is preferably formed in the head section.

The diaphragm is preferably mounted radially on the outside with a clamping action between the main body section and the head section.

In the region of the diaphragm which serves to separate the first cavity from the second cavity, the diaphragm preferably has a thickness of 0.5 mm to 1.25 mm, in particular 0.7 mm to 0.8 mm. In order to bring about a defined deformation of the diaphragm, it is regarded as advantageous if the thickness of the diaphragm varies in accordance with the radial distance from the rod. It is thereby possible to promote the deformation of the diaphragm in such a way that the volume of the cavities does not change during a stroke of the rod.

In a preferred development of the device, it is envisaged that a barrier medium is arranged adjoining the diaphragm in the second cavity. By means of this barrier medium, it is possible to prevent unwanted substances from diffusing from the second cavity into the first cavity through the diaphragm, especially if the diaphragm is permeable to such substances. The unwanted substances can be water or oxygen, for example.

The barrier medium can be nitrogen, a noble gas, dry air or a liquid medium, e.g. a cleaner for polyurethane adhesives (PUR cleaner), a gel, a plasticizer or a grease, in particular a grease based on mineral oil and bentonite.

The barrier medium preferably completely covers a diaphragm region adjoining the cavity.

In respect of the barrier medium, it is quite conceivable for the barrier medium to form the pressure medium.

It is regarded as particularly advantageous if a center line of a section of the at least one channel which opens into the first cavity intersects the diaphragm. An associated inflow of the flowable medium into the first cavity has proven advantageous in respect of the mechanical loading of the diaphragm and especially also in respect of the avoidance of dead spaces in the first cavity, i.e. those spaces in the first cavity in which no inflow or outflow or substantially no inflow or outflow of the flowable medium occurs.

The diaphragm preferably comprises a thermoplastic, in particular the diaphragm is composed of a thermoplastic.

Moreover, a thermoplastic typically has a higher temperature stability, and therefore a diaphragm which comprises a thermoplastic or is composed of a thermoplastic is resistant even to flowable media at a relatively high temperature, e.g. above 120° C., in particular a temperature above 185° C., preferably a temperature above 200° C., which are typical processing temperatures of hot melt adhesives. The range from 120° C. to 185° C. is the preferred temperature range for hot melt adhesives. The temperature of the flowable medium can be in the range of from 0° C. to 220° C. The temperature is preferably between 20° C. and 200° C. and particularly preferably between 120° C. and 185° C.

The thermoplastic is, in particular, MFA (perfluoromethylalkoxy), PFA (perfluoroalkoxy), FEP (fluoroethylenepropylene), PTFE (polytetrafluoroethylene), PEEK (polyether ether ketone), or PI (polyimides).

The use of one of the abovementioned thermoplastics has the advantage over an elastomer material that these thermoplastics are chemically more stable than an elastomer material especially in relation to aromatic hydrocarbons. Moreover, it has been found that a better, in particular more leak tight, non-positive and/or positive joint can be produced with one of the abovementioned thermoplastics than with the conventional elastomer materials. In addition to the abovementioned thermoplastics, however, other thermoplastics are also conceivable, which have a sufficiently high chemical resistance to the flowable medium used.

It is regarded as particularly advantageous if a material of the diaphragm, in particular of the thermoplastic, is flexible in shape and inflexible in volume.

The diaphragm is preferably flexible.

In order to improve the switching properties of the device, it is regarded as particularly advantageous if, in the first end position of the rod, a section of the diaphragm which is arranged in the interior space and adjoins the housing and a section of the diaphragm which adjoins the rod are arranged in the same plane, wherein the plane is formed perpendicularly to the axial direction.

The diaphragm is preferably of rotationally symmetrical design.

It is regarded as particularly advantageous if the diaphragm is of disk-shaped or substantially disk-shaped design.

The diaphragm is preferably designed as a flat diaphragm, beaded diaphragm or rolling diaphragm.

In a preferred embodiment of the device, it is envisaged that the diaphragm has at least one section, which surrounds the rod, extending around it radially, and is arched in the axial direction, preferably two sections arched in opposite directions.

The embodiment of the diaphragm with an arched section has the effect that the forces occurring at the diaphragm during the changeover of the rod from the first end position to the second end position and vice versa can be absorbed particularly effectively, thereby reducing the mechanical loading of the diaphragm and thus increasing the life of the diaphragm.

It is regarded as particularly advantageous if the radially outermost arched section is arched in the direction of the second cavity. Configuration of the diaphragm in this way is advantageous particularly when the flowable medium flows into the first cavity radially on the outside since this configuration of the diaphragm avoids the formation of dead spaces, i.e. regions in which there is no or virtually no exchange of the flowable medium.

The axial distance between the first end position and the second end position is preferably between 0.05 mm and 1 mm.

The method according to the invention for operating the device according to the invention envisages that the flowable medium is arranged in the first cavity, wherein the flowable medium acts on the diaphragm with a first pressure, wherein the pressure medium arranged in the second cavity acts on the diaphragm with a second pressure opposed to the first pressure, wherein the magnitude of the second pressure is 90% to 110% of the first pressure. The method promotes a reduction in the resulting force acting on the diaphragm as compared with a diaphragm without an oppositely acting pressure medium, and this has an advantageous effect on the life of the device and the operational reliability of the device.

In respect of the method, it is regarded as particularly advantageous if the first pressure is at most 100 bar, preferably 20 bar to 100 bar, in particular 50 bar to 100 bar, preferably 60 bar to 90 bar, particularly preferably 70 bar to 80 bar.

The temperature of the flowable medium is preferably 180° C. to 220° C.

The flowable medium is, in particular, a hot melt adhesive.

The device is preferably operated at a switching frequency of 0 to 150 Hz.

BRIEF DESCRIPTION OF THE DRAWING FIGURE

The invention is illustrated in the accompanying drawing FIGURE with reference to an exemplary embodiment without being restricted thereto.

FIG. 1 shows a partial region of a device for dispensing a flowable medium in section, parallel to an axial direction.

DETAILED DESCRIPTION OF EXEMPLARY EMBODIMENT OF THE INVENTION

FIG. 1 shows a device 1 according to the invention for dispensing a flowable medium, in the present case for dispensing a hot melt adhesive. The device 1 has a head section 12 and a main body section 13. In this arrangement, the head section 12 is inserted into the main body section 13 and connected to the main body section 13, preferably being screwed to the latter at an end.

The head section 12 and the main body section 13 form elements of a housing of the device 1, wherein this housing has an interior space with two cavities 2, 3.

The device 1 has a flexible diaphragm 7, wherein a rod 5 mounted in the housing passes through the diaphragm 7 and wherein the diaphragm 7 is mounted in a sealed manner in the housing radially on the outside, in the present case being held with a clamping action between the head section 12 and the main body section 13, and is mounted in a sealed manner in the rod 5 radially on the inside, in the present case being held with a clamping action in the rod 5. The diaphragm 7 is connected to the rod 5 in a manner fixed relative to the rod 5, wherein in the present case the diaphragm 7 is held with a clamping action between a radial projection 16 of the rod 5 and a sleeve 14 connected to the rod 5. In the region of this clamping, the diaphragm 7 has a bead 17. The diaphragm 7 also has a bead 18 in its radially outer region, which is mounted with a clamping action between the head section 12 and the main body section 13.

The diaphragm 7 is arranged in the interior space in such a way that it divides said space into a first cavity 2, which is rotationally symmetrical with respect to an axis passing through rod 5, and a second cavity 3, which is rotationally symmetrical with respect to the axis passing through rod 5, wherein the diaphragm 7 separates the first cavity 2 from the second cavity 3 in a fluid tight manner.

The first cavity 2 serves to hold the flowable medium, wherein the device 1, in the present case the head section 12, has a channel 11 which opens into the first cavity 2 and through which the flowable medium can flow into the first cavity 2.

The channel 11 is of angled configuration, wherein a center line 15 of a section of the channel 11 which opens into the first cavity 2 intersects the diaphragm 7. Thus, the inflowing flowable medium flows into the first cavity 2 in the direction of the second cavity 3.

The head section 12 of the device 1 furthermore has a dispensing opening 4, which opens into the first cavity 2, for dispensing the flowable medium.

For the purpose of closing the dispensing opening 4, the rod 5 has a sealing section 6. The rod 5 can be moved by means of an actuator (not illustrated) between a first end position and a second end position in an axial direction Z and vice versa, wherein the sealing section 6 closes the dispensing opening 4 in the first end position and is arranged at a distance from the dispensing opening 4 in the second end position. FIG. 1 shows the first end position in the left-hand half and the second end position in the right-hand half.

The lift H, i.e. the axial distance between the first end position and the second end position of the rod 5, is preferably in a range of from 0.05 mm to 1 mm.

The actuator can be a pneumatic cylinder, an electromechanical drive or an electropneumatic drive, for example.

A pressure medium acting on the diaphragm 7 is arranged in the second cavity 3, wherein in the present case the pressure medium is a liquid.

In the present case, the second cavity 3 is configured in such a way that the second cavity 3 is sealed off in a fluid tight manner during the operation of the device 1, and therefore no outflow or inflow of the fluid acting as the pressure medium is possible.

The diaphragm 7 is held with a clamping action between a housing wall section 8 delimiting the first cavity 2 and a housing wall section 9 delimiting the second cavity 3, wherein wall section 8 is part of the head section 12 and wall section 9 is part of the main body section 13.

In the first end position of the rod 5, a section of the diaphragm 7 which is arranged in the interior space and adjoins the housing and a section of the diaphragm 7 which adjoins the rod 5 are arranged in the same plane, wherein the plane is formed perpendicularly to the axial direction Z. This can be seen especially from the left-hand half of FIG. 1.

The diaphragm 7 has precisely two sections 10, which surround the rod 5, extending around it radially, and are arched in the axial direction Z, wherein the two sections 10 are arched in opposite directions. In this case, the radially outermost arched section 10 is arched in the direction of the second cavity 3. In the sectional illustration shown in FIG. 1, an undulating cross section of the diaphragm 7 is thus obtained.

By means of the device 1, it is possible to process flowable media which are under a high pressure, e.g. a pressure of 80 to 100 bar, and temperatures in a range of from 120° C. to 185° C., such as those which typically arise during the processing of hot melt adhesives, and yet to achieve a high switching frequency and a precise switching behavior and nevertheless a long life of the diaphragm 7.

In addition to use for dispensing a hot melt adhesive, slight structural modifications also enable the device 1 to be used for control purposes. Slight structural modifications enable the device 1 to be used as a pressure control valve or as a restrictor, for example.

When used as a restrictor or as a pressure control valve, the dispensing opening 4 remains permanently open in operation, and thus the rod 5 is outside the first end position. In this case, the axial distance from the first end position is either continuously controlled in order to limit or regulate a pressure, or the distance remains constant for a restrictor function.

The device 1 can also be used to limit a pressure and can thus be a safety element, which is normally closed, the rod 5 thus being in the first end position, and very seldom performs the function of pressure limitation, in which the rod 5 transfers to a position which does not correspond to the first end position.

That which is claimed is:
1. A device for dispensing a flowable medium comprising:
a housing with an interior space;
a rod mounted in the housing, wherein the rod is movable between a first end position and a second end position in an axial direction;
a diaphragm, wherein the rod passes through the diaphragm, wherein the diaphragm is mounted in a sealed manner in the housing radially on the outside and is mounted in a sealed manner in the rod radially on the inside, wherein the diaphragm divides the interior space into a first cavity and a second cavity, wherein the diaphragm separates the first cavity from the second cavity in a fluid tight manner, and wherein the first cavity serves to hold the flowable medium;
at least one channel which opens into the first cavity and through which the flowable medium can flow into the first cavity; and
a dispensing opening, opening into the first cavity, for dispensing the flowable medium, wherein the rod has a sealing section, wherein the sealing section closes the dispensing opening in the first end position and is arranged at a distance from the dispensing opening in the second end position;
wherein a pressure medium acting on the diaphragm is arranged in the second cavity, wherein the pressure medium is formed by a fluid or by an elastomer.

2. The device as claimed in claim 1, wherein the second cavity is sealed off in a fluid tight manner.

3. The device as claimed in claim 1, wherein the diaphragm is connected to the rod in a manner fixed relative to the rod.

4. The device as claimed in claim 3, wherein the diaphragm is held in the rod with a clamping action.

5. The device as claimed in claim 1, wherein the diaphragm is held with a clamping action between a housing wall section delimiting the first cavity and a housing wall section delimiting the second cavity.

6. The device as claimed in claim 1, wherein a barrier medium is arranged adjoining the diaphragm in the second cavity.

7. The device as claimed in claim 1, wherein a center line of a section of the at least one channel which opens into the first cavity intersects the diaphragm.

8. The device as claimed in claim 1, wherein the diaphragm comprises a thermoplastic.

9. The device as claimed in claim 1, wherein a material of the diaphragm is flexible in shape and inflexible in volume.

10. The device as claimed in claim 1, wherein, in the first end position of the rod, a section of the diaphragm which is arranged in the interior space and adjoins the housing and a section of the diaphragm which adjoins the rod are arranged in the same plane, and wherein the plane is formed perpendicularly to the axial direction.

11. The device as claimed in claim 1, wherein the diaphragm is designed as a flat diaphragm, a beaded diaphragm or a rolling diaphragm.

12. The device as claimed in claim 1, wherein the diaphragm has at least one section, which surrounds the rod and extends around the rod radially, and is arched in the axial direction.

13. A method for operating the device as claimed in claim 1, wherein the flowable medium is arranged in the first cavity, wherein the flowable medium acts on the diaphragm with a first pressure, wherein the pressure medium arranged in the second cavity acts on the diaphragm with a second pressure opposed to the first pressure, wherein the magnitude of the second pressure is 90% to 110% of the first pressure.

14. The method as claimed in claim 13, wherein the first pressure is 20 bar to 100 bar.

15. The device as claimed in claim 1, wherein the flowable medium is a hot melt adhesive.

16. The device as claimed in claim 8, wherein the diaphragm is composed of a thermoplastic.

17. The device as claimed in claim 9, wherein the material of the diaphragm comprises a thermoplastic.

18. The device as claimed in claim 12, wherein the diaphragm has two sections arched in opposite directions.

19. The method as claimed in claim 14, wherein the first pressure is 70 bar to 80 bar.

* * * * *